United States Patent [19]

Takahashi

[11] Patent Number: 4,585,949
[45] Date of Patent: Apr. 29, 1986

[54] METHOD OF AND APPARATUS FOR SHAFT POWER GENERATION

[76] Inventor: Takashi Takahashi, 26-18, Kamisoshigaya 1, Setagaya-ku, Tokyo, Japan, 157

[21] Appl. No.: 657,450

[22] Filed: Oct. 4, 1984

[30] Foreign Application Priority Data

Oct. 5, 1983 [JP] Japan ................. 58-185153

[51] Int. Cl.$^4$ ............................................. F16H 37/08
[52] U.S. Cl. ....................................... 290/1 C; 318/12
[58] Field of Search ........................... 290/1 R, 1 C, 4; 318/12, 13

[56] References Cited

U.S. PATENT DOCUMENTS 4,382,188 5/1983 Cronin ............................... 290/1 C

FOREIGN PATENT DOCUMENTS 876884 9/1961 United Kingdom ................. 318/12

Primary Examiner—William M. Shoop, Jr.
Assistant Examiner—W. E. Duncanson, Jr.
Attorney, Agent, or Firm—Armstrong, Nikaido, Marmelstein & Kubovcik

[57] ABSTRACT

A method of shaft power generation includes: a step of dividing mechanical power taken out from a main engine into two portions for respective systems; a step of inputting one of the portions of the divided mechanical power directly to a differential planetary gear mechanism; a step of inputting the other portion of the divided mechanical power to the differential planetary gear mechanism through a subsidiary generator, a thyristor or transistor controller and a thyristorized or transistorized motor, each of which has a capacity which is equal to a value obtained by adding a slight allowance to a value obtained by multiplying the capacity of a main generator by the ratio between, on the one hand, a value obtained by the difference between the lowest and highest number of revolutions of the main engine of the range within which the mechanical power therefrom is employed for power generation and, on the other hand, the highest number of revolutions, thereby combining into one the two portions of the divided mechanical power; and a step of driving the main generator at its rated number of revolutions by the combined mechanical power output from the differential planetary gear mechanism.

8 Claims, 7 Drawing Figures

METHOD OF AND APPARATUS FOR SHAFT POWER GENERATION

BACKGROUND

The present invention relates to a method of and apparatus for shaft power generation by the use of an engine. More particularly, the invention pertains to a method of and apparatus for shaft power generation suitable for use in a constant-frequency power generation which is effected by taking out mechanical power from an engine whose number of revolutions varies, such as the main engine of a vessel.

In the shaft power generation method for use in vessels, the main engine for driving a propeller is employed as a mechanical power source, and it is general practice to additionally employ an auxiliary engine such that it is also possible to generate electric power by the auxiliary engine. However, the auxiliary engine is smaller in size and higher in speed than the main engine which has a relatively long stroke and is relatively low in speed, and the auxiliary engine uses fuel oil A, which is of high quality. Therefore, the auxiliary engine is much higher in fuel cost. For this reason, while the main engine is operating, it is efficient and economical practice to take out mechanical power for power generation from the main engine, which is superior to the auxiliary engine in fuel cost. Moreover, it is desirable to operate the auxiliary engine for power generation only on special occasions, for example, when the main engine cannot be operated, or when the vessel is at anchor.

However, the main engine has special characteristics whereby the number of revolutions thereof is not constant but varies incessantly in accordance with the running conditions of the vessel. Therefore, in order to generate electric power of constant frequency, it is necessary to contrive such a means as to constantly maintain the number of revolutions of a power generator at its rated number of revolutions. To obtain a constant rated number of revolutions of the power generator, the eddy current method, the slide clutch method or the thyristor method has hitherto been employed and put into practical use in the case of small-capacity power generation. In the case of large-capacity power generation in a large-sized vessel or the like, however, it is necessary to employ the thyristor method for the sake, for example, of efficiency. As is well known, a thyristor controller has the disadvantage that the cost thereof becomes high in substantially geometric progression as its capacity increases.

Further, since vessels generally have limited space available therein, when a power generation apparatus of the type described above is provided therein, it is desirable that the apparatus should be arranged such as to be as compact as possible so as not to occupy an unnecessarily large space.

SUMMARY

It is a primary object of the present invention to provide a low-cost and high-efficiency shaft power generation method which permits large-capacity power generation by the use of a thyristor or transistor controller of a relatively small capacity which is only about one fourth to one sixth of the rated power generation capacity of a main generator, by making it possible to effect a constant-frequency power generation within a variability range of about 25% of the number of revolutions of a main engine in relation to power generation and by controlling the revolution number region of the engine corresponding to the variability range.

To this end, according to the present invention, the mechanical power taken out from a main engine is divided into two portions for respective systems. One of the portions of the divided mechanical power is directly input to a differential planetary gear mechanism. The other portion of the divided mechanical power is input to the differential planetary gear mechanism through a subsidiary generator, a thyristor or transistor controller and a thyristorized or transistorized motor, each of which has a capacity which is equal to a value obtained by adding a slight allowance to a value obtained by multiplying the capacity of a main generator by the ratio between a first value and a second value, the first value being obtained by the difference between the lowest and highest number of revolutions of the main engine of the range within which the mechanical power therefrom is employed for power generation, the second value being the highest number of revolutions, thereby combining into one the two portions of the divided mechanical power. This main generator is then driven at its rated number of revolutions by the combined mechanical power output from the differential planetary gear mechanism.

It is another object of the present invention to provide a shaft power generation method which makes it possible to immediately change over the power generation modes from one to another and to effect an efficient power generation by changing over switches even when a portion of the devices which constitute a shaft power generation apparatus breaks down or is required to be taken out of action, thereby allowing the safety of the vessel to be ensured.

To this end, according to the present invention, the above-described shaft power generation system is further provided with an electric circuit which is adapted to input to the thyristor or transistor controller a portion of the electric power derived from the main generator or a portion of the electric power from the auxiliary generator.

It is still another object of the present invention to provide a shaft power generation apparatus which is compactly constructed as a whole by properly arranging a differential planetary gear mechanism, a main generator, a subsidiary generator, a speed-up gear disposed between the differential planetary gear mechanism and the subsidiary generator, etc., such that these devices in combination constitute a compact shaft power generation apparatus.

The above and other objects, features and advantages of the present invention will become more apparent from the following description of the preferred embodiments thereof, taken in conjunction with the accompanying drawings.

THE DRAWINGS

THE PREFERRED EMBODIMENTS

Figure 1:
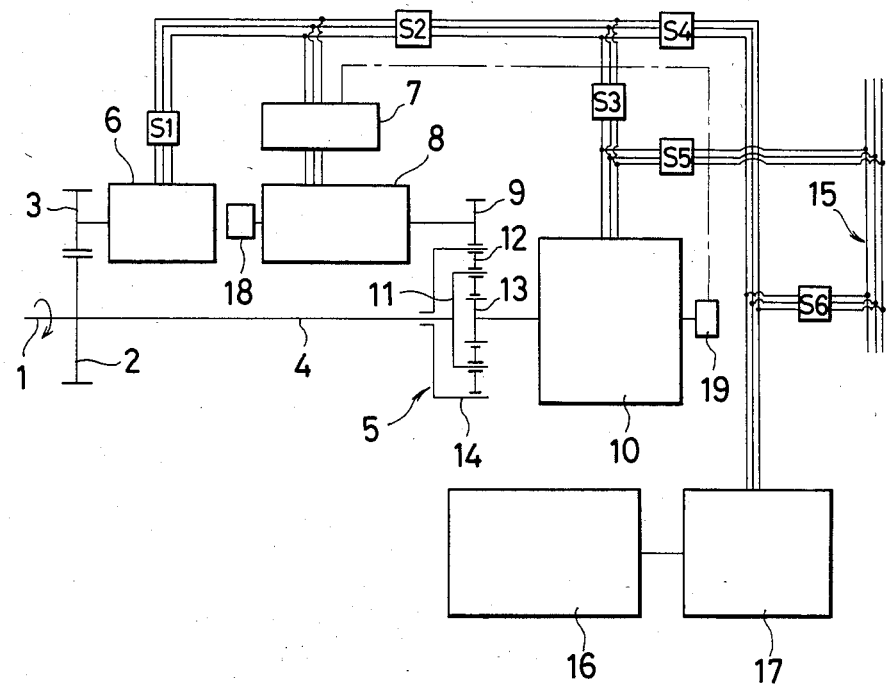
FIG. 1 is an illustration showing the principle of a shaft power generation apparatus to which the present invention is applied.

FIG. 1 schematically shows a shaft power generation apparatus for a vessel in accordance with one embodiment of the present invention.

The reference numeral 1 denotes a power take-out shaft (PTO shaft) for taking out mechanical power from a main engine, not shown. The mechanical power taken out by the power take-out shaft 1 is divided into two portions for respective systems through gears 2, 3. One of the portions of the divided mechanical power is directly input through a transmission shaft 4 to a differential planetary gear mechanism 5 which is constructed as described later. The other portion of the divided mechanical power is employed to drive a subsidiary generator 6 through the gear 3. The output of the subsidiary generator 6 is input to a thyristor controller 7 through a switch S1. The thyristor controller 7 is adapted to control the number of revolutions of a thyristorized motor 8 in correspondence with the number of revolutions of a main generator 10 in response to a detection signal from a revolution number detector 19 which is provided on the main generator 10. The output of the thyristorized motor 8 is input to the differential planetary gear mechanism 5 through a gear 9. The two portions of the divided mechanical power are combined into one again by the differential planetary gear mechanism 5 and are employed to drive the main generator 10 at a constant rated number of revolutions.

The capacity of the subsidiary generator 6, the thyristor controller 7 and the thyristorized motor 8 is selected such as to be equal to a value which is obtained by adding a slight allowance to a value obtained by multiplying the capacity of the main generator 10 by the ratio between a first value and a second value, the first value being obtained by the difference between the lowest and highest number of revolutions of the main engine of the range within which the mechanical power therefrom is employed for power generation, the second value being the highest number of revolutions. The electric power output from the main generator 10 is delivered to conductors 15 on the load side through a switch S5. The output circuit is provided with an electric circuit which is adapted to return a portion of the generated electric power to the thyristor controller 7 through switches S3, S2.

The differential planetary gear mechanism 5 is arranged such that a carrier 11 which supports a planetary gear 12 constitutes the input side of the mechanism 5 such as to input the mechanical power transmitted by the transmission shaft 4, and a sun gear 13 which is meshed with the planetary gear 12 constitutes the output side of the mechanism 5 such as to drive the main generator 10. An annular gear 14 disposed outside the planetary gear 12 has an inner gear 14i and an outer gear 14o which are respectively formed on the inner and outer surfaces thereof. The inner gear 14i is meshed with the planetary gear 12, while the outer gear 14o is meshed with the gear 9 on the output side of the thyristorized motor 8 such as to input the output of the thyristorized motor 8.

The thyristorized motor 8 is provided with a brake or lock device 18 for suspending the rotating shaft of the motor 8.

The reference numeral 16 denotes an auxiliary engine, while the numeral 17 represents an auxiliary generator which is driven by the auxiliary engine 16. The output side of the auxiliary generator 17 constitutes an electric circuit which allows the generated electric power to be supplied to the conductors 15 on the load side through a switch S6. The output side of the auxiliary generator 17 is further connected with a circuit which allows a portion of the generated electric power to be input to the thyristor controller 7 through a switch S4 and the switch S2.

The following is a description of the power generating operation of the above-described shaft power generation apparatus.

Figure 2:
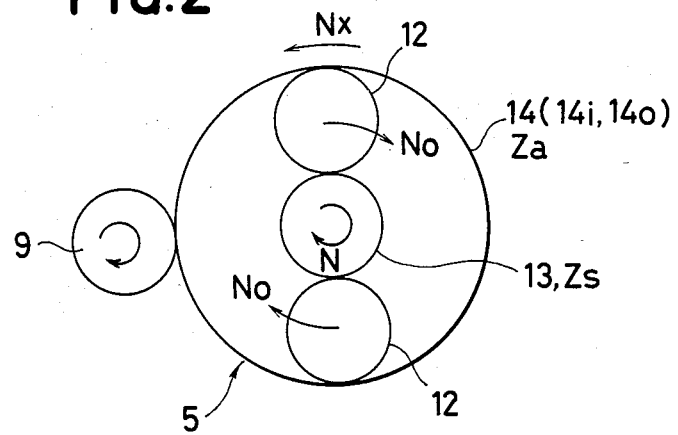
FIG. 2 is an illustration showing a differential planetary gear mechanism portion in the shaft power generation apparatus shown in FIG. 1.

Referring to FIG. 2, if the number of revolutions and the number of teeth of the sun gear 13 which outputs a combined mechanical power in the differential planetary gear mechanism 5 are respectively represented by N and Zs, N is a constant value as the rated number of revolutions of the main generator 10. Further, respectively representing the number of revolutions and the number of teeth of the annular gear 14 which inputs the mechanical power from the thyristorized motor 8 by Nx and Za, and representing the number of revolutions of the transmission shaft 4 (power take-out shaft 1) by No, the rated number of revolutions of the sun gear 13 is given by the following formula:

$$N = No(Za+Zs)/Zs + Nx \cdot Za/Zs$$

(where Nx is opposite in direction to N and No)

Here, if $Za/Zs = r$, and the revolution number Nx at which the annular gear 14 is to rotate is calculated from the above-mentioned formula, then the revolution number Nx is determined as follows:

$$Nx = 1/r[N - No(r+1)] \tag{1}$$

In other words, it is necessary to control the rotation of the thyristorized motor 8 such that the rotation of the annular gear 14 satisfies the above-mentioned formula (1).

As one example, now let us simply obtain a theoretical value as a rough estimate in order to facilitate understanding, and, assuming that the number of revolutions of the thyristorized motor is 0 when the main engine operates at its highest number of revolutions, the rated number of revolutions N is given by N=1,200 r.p.m. if the rated power generation capacity of the main generator 10 is 1,000 kw and the main generator 10 has six poles. On the other hand, if r=3, and the working speed variation range of the main engine is 25%, and the number of revolutions No of the power take-out shaft 1 which takes out mechanical power from the main engine is 290 r.p.m., then the lower-limit revolution number No' of the power take-out shaft 1 is given by No'=290×0.75=217.5 r.p.m.

Accordingly, the range within which the number of revolutions of the annular gear 14 is to be controlled is determined as follows: The lower limit Nx of the range is given by $$Nx = \tfrac{1}{3}(1{,}200 - 290 \times 4) = 13.3 \ r.p.m.$$

On the other hand, the upper limit Nx' of the range is given by $$Nx' = \tfrac{1}{3}(1{,}200 - 217.5 \times 4) = 110 \ r.p.m.$$

If the number of revolutions of the annular gear 14 is controlled such as to be within the range between 13.3 and 110 r.p.m., then it is possible to constantly maintain the number of revolutions of the main generator 10 at the rated number of revolutions, that is, 1,200 r.p.m.

Next, assuming that the maximum necessary power of the annular gear 14 is w kw, since the maximum number of revolutions thereof is 110 r.p.m., w is given by $$w = r \times 110/1{,}200 \times 1{,}000 \ kw = 275 \ kw$$

In this case, therefore, the required capacity of the subsidiary generator 6 is determined to be 275 kw. In other words, in the case where the power generation capacity of the main generator 10 is 1,000 kw, according to the above-described power generation method, it is, theoretically, only necessary to provide the subsidiary generator 6, the thyristor controller 7, the thyristorized motor 8 and the differential planetary gear mechanism 5, each of which only has a capacity on the order of 275 kw.

It is to be noted that, in practice, the capacity of each of the above-described devices is, as a matter of course, slightly larger than the above-described value, since it is difficult to control the number of revolutions of the thyristorized motor at 0 when the main engine operates at its maximum number of revolutions; from this viewpoint therefore, it is necessary to rotate the thyristorized motor at a small number of revolutions, as well as from the viewpoint of efficiency.

However, it is advantageously possible to eliminate the need for providing a thyristor controller of a relatively large capacity corresponding to the power generation capacity of the main generator, for example, 1,000 kw, as in the case of the conventional method, and it suffices to provide a thyristor controller having a capacity which is only about one fourth to one sixth of the power generation capacity of the main generator. Thus, it is possible to obtain power generation equipment which is much lower in cost than the conventional.

Further, by the shaft power generation apparatus in accordance with the embodiment which is provided with the above-described electric circuit, it is possible to selectively effect power generation in the following three different modes by changing over the switches even when a portion of the equipment breaks down or is required to be taken out of action.

Namely, in the case of normal operation, the switches S1, S5 are turned ON, while the other switches S2, S3, S4, S6 are turned OFF, whereby all the electric power generated by the subsidiary generator 6 is input to the thyristorized motor 8 through the thyristor controller 7. In such case, power generation is effected 100% by the main engine.

In the case where the subsidiary generator 6 breaks down or is required to be taken out of action, it is only necessary to turn ON the switches S2, S4, S5 and to turn OFF the other switches S1, S3, S6. In such case, the electric power generated by the auxiliary generator 17 is allowed to be input to the thyristor controller 7 such as to control the thyristorized motor 8. In other words, the main and auxiliary engines operate in parallel.

On the other hand, in the case where not only the subsidiary generator 6 but also the auxiliary engine 16 and the auxiliary generator 17 break down or are required to be taken out of action, it is only necessary to turn ON the switches S2, S3, S5 and turn OFF the other switches S1, S4, S6. To start operating the apparatus in such case, the brake or lock device 18 for the thyristorized motor 8 is actuated to stop the thyristorized motor 8 and is released after the main generator 10 has been started. In this case, power generation is effected 100% by the main engine, and, at this time, as the number of revolutions of the main engine decreases, the generated power output decreases correspondingly.

Figure 3:
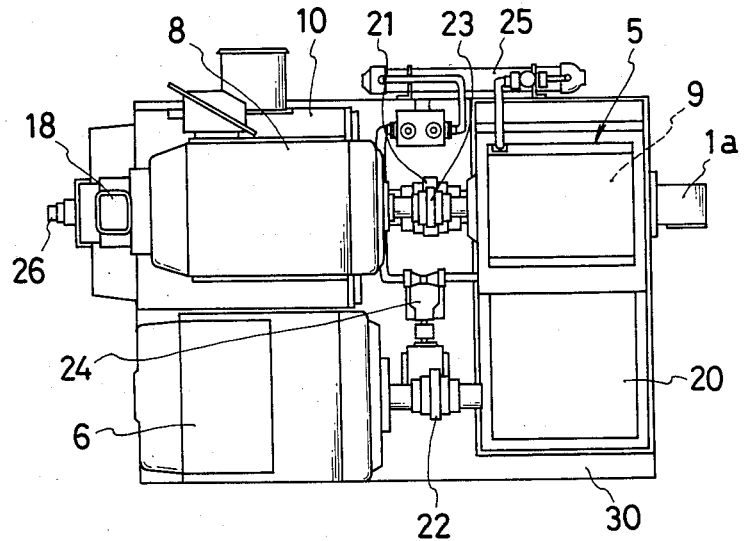
FIG. 3 is a plan view of one example of layout of various devices employed in the shaft power generation apparatus shown in FIG. 1.
Figure 4:
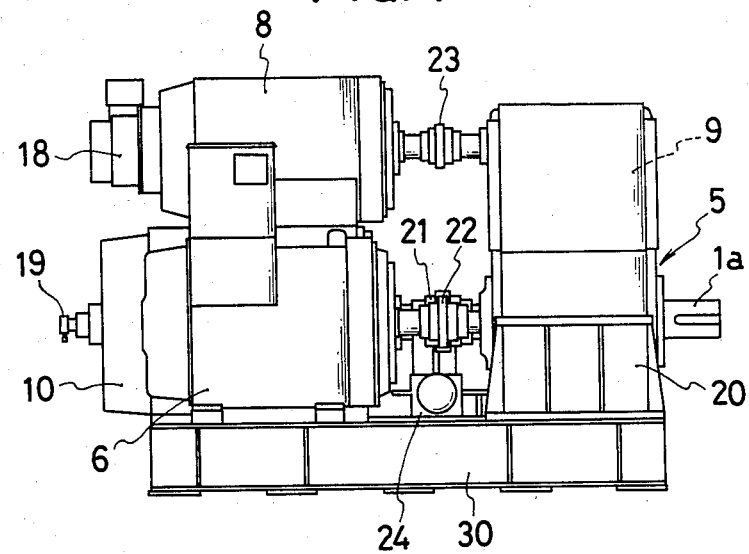
FIG. 4 is a front elevational view of the apparatus shown in FIG. 3.
Figure 5:
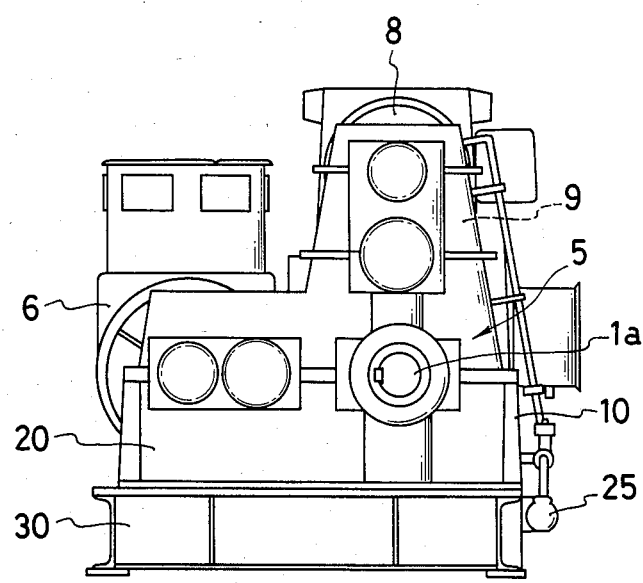
FIG. 5 is a side elevational view of the apparatus shown in FIG. 3.

FIGS. 3 to 5 are illustrations of a layout of principal devices in combination constituting the above-described shaft power generation apparatus, showing one embodiment thereof which makes it possible to compactly house the apparatus when it is to be installed in front of the main engine.

Referring to FIGS. 3 to 5, the differential planetary gear mechanism 5 and the main generator 10 are disposed in series on the upper surface on one of the sides of a base board 30. The subsidiary generator 6 is disposed on the upper surface of the other side of the base board 30 such as to be in parallel to the main generator 10. Further, the thyristorized motor 8 is secured to the upper side of the main generator 10. An input shaft 1a is projected from the front end of the differential planetary gear mechanism 5 thus disposed. To the input shaft 1a is input the mechanical power from the power take-out shaft 1 of the main engine.

The mechanical power input to the input shaft 1a is halved by the speed-up gear 20 which is provided on the side of the differential planetary gear mechanism 5. One of the portions of the halved mechanical power is input to the subsidiary generator 6 through a coupling 22. On the upper side of the differential planetary gear mechanism 5 is disposed a gear corresponding to the gear 9 which is meshed with the outer gear 14o of the annular gear 14 shown in FIG. 2, whereby the other portion of the halved mechanical power is input to the thyristorized motor 8 through a coupling 23. Further, the output shaft projecting from the rear end of the differential planetary gear mechanism 5 is connected to the main generator 10 through a coupling 21.

The reference numeral 24 denotes an oil pump which supplies a lubricating oil such that it recirculates through the differential planetary gear mechanism 5 and other devices. The arrangement is such that the lubricating oil is cooled by an oil cooler 25 in the course of recirculation. The reference numeral 18 denotes a brake for the thyristorized motor 8, while the numeral 19 represents a revolution number detector which detects the number of revolutions of the main generator 10.

Since the above-described shaft power generation apparatus has a plurality of principal devices disposed as described above, the entire length of the apparatus as a whole is reduced in plan, and therefore, the layout is very suitable for compactly installing the apparatus in front of the main engine.

Figure 6:
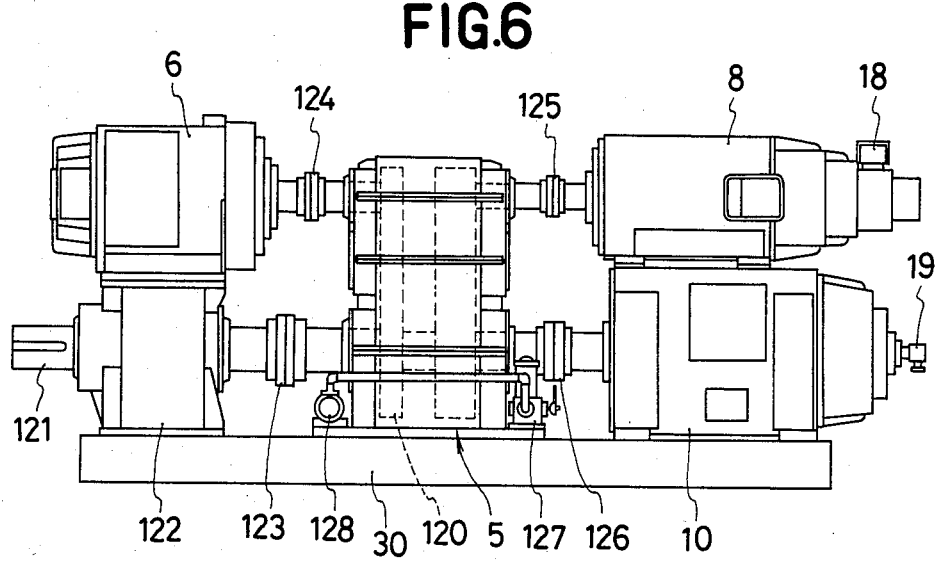
FIG. 6 is a front elevational view of another example of layout of the various devices employed in the shaft power generation apparatus in accordance with the present invention.
Figure 7:
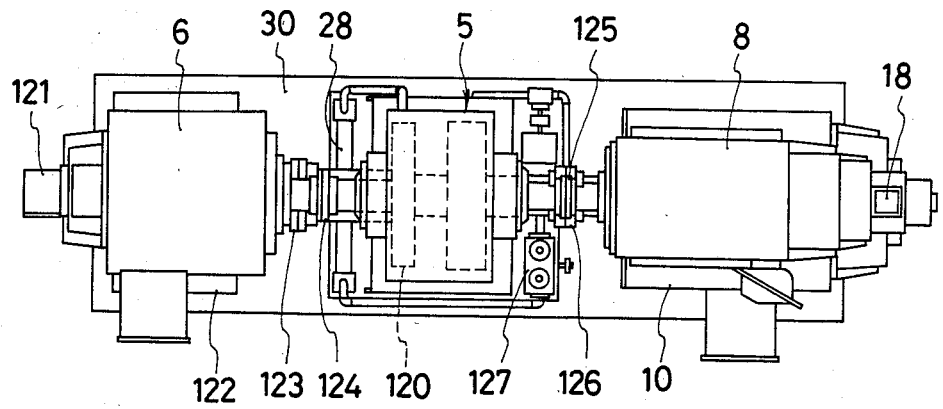
FIG. 7 is a plan view of the apparatus shown in FIG. 6.

FIGS. 6 and 7 are illustrations of another layout of the above-described principal devices of the shaft power generation apparatus, which makes it possible to compactly house the apparatus on a side surface of the main engine.

Referring to FIGS. 6 and 7, the shaft power generation apparatus is arranged such that the differential planetary gear mechanism 5 is installed in the center of the upper surface of the elongated base board 30 and is provided inside on the input-side thereof with a speed-up gear 120. On the input side of the differential planetary gear mechanism 5 thus provided with the speed-up gear 120, an intermediate shaft 121 which inputs the mechanical power from the power take-out shaft 1 of the main engine is installed, being supported by a bearing pedestal 122. Further, the main generator 10 is installed on the output side of the differential planetary gear mechanism 5. By such an arrangement on the base board 30, the intermediate shaft 121, the differential planetary gear mechanism 5 and the main generator 10 are disposed in series. Further, the above-described subsidiary generator 6 is secured to the upper side of the bearing pedestal 122 which supports the intermediate shaft 121, while the above-described thyristorized motor 8 is secured to the upper side of the main generator 10.

In the above-described layout, the mechanical power input to the intermediate shaft 121 from the main engine is transmitted to the differential planetary gear mechanism 5 through a coupling 123. A portion of the mechanical power is, however, separated in the speed-up gear 120 and is transmitted to the subsidiary generator 6 through a coupling 124. On the other hand, on the upper side of the differential planetary gear mechanism 5 is disposed a gear corresponding to the gear 9 which is meshed with the outer gear 14o of the annular gear 14 shown in FIG. 1, such that the output of the thyristorized motor 8 is input to the differential planetary gear mechanism 5 through a coupling 125. The output shaft projecting from the rear end of the differential planetary gear mechanism 5 to which the two portions of the halved mechanical power are thus input from two portions is adapted to output a combined mechanical power to the main generator 10 through a coupling 126.

The reference numeral 127 denotes an oil pump which recirculates a lubricating oil through the differential planetary gear mechanism 5 and other devices. The lubricating oil is cooled by an oil cooler 128 in the course of recirculation. The reference numeral 19 denotes a revolution number detector which detects the number of revolutions of the main generator 10. By a detection signal from the detector 19, the rotation of the subsidiary generator 6 is controlled through the thyristor controller 7. The reference numeral 18 represents a brake for the above-described thyristorized motor 8.

The shaft power generation apparatus having the above-described layout is arranged as follows: the intermediate shaft 121 provided on the input side of the apparatus, the differential planetary gear mechanism 5 and the main generator 10 are secured in series to the upper surface of the base board 30; the subsidiary generator 6 is installed on the upper side of the bearing pedestal 122 which supports the intermediate shaft 121; and the thyristorized motor 8 is installed on the upper side of the main generator 10. Therefore, it is possible to compactly house the apparatus in a space which has an exceedingly small width. Accordingly, the apparatus arranged in accordance with this layout is very suitable for installing the apparatus on a side surface of the main engine.

It is to be noted that, although in the above-described embodiment the shaft power generation apparatus according to the present invention is provided on the main engine in a vessel, the invention is also applicable to a shaft power generation apparatus which is provided on the main engine in engine-operated machines other than vessels.

Further, according to the invention, the thyristor controller may be of a relatively small capacity as described above. Therefore, a transistor controller may be employed in place of the thyristor controller, and a transistorized motor may be substituted for the thyristorized motor.

I claim:

1. A method of shaft power generation in which mechanical power is taken out from a main engine whose number of revolutions varies and is employed to drive a main generator at its rated number of revolutions, thereby generating electric power, said method comprising the steps of:
   dividing through gears the mechanical power taken out from said main engine into two portions for respective systems;
   inputting one of the portions of the divided mechanical power directly to a differential planetary gear mechanism;
   inputting the other portion of the divided mechanical power to said differential planetary gear mechanism through a subsidiary generator, a thyristor controller and a thyristorized motor, each of which has a capacity which is equal to a value obtained by adding a slight allowance to a value obtained by multiplying the capacity of said main generator by the ratio between a first value and a second value, said first value being obtained by the difference between the lowest and highest number of revolutions of said main engine of the range within which the mechanical power therefrom is employed for power generation, said second value being said highest number of revolutions, thereby combining into one said two portions of the divided mechanical power; and
   driving said main generator at its rated number of revolutions by the combined mechanical power output from said differential planetary gear mechanism.

2. A method of shaft power generation according to claim 1, wherein said thyristor controller is replaced by a transistor controller, and said thyristorized motor is replaced by a transistorized motor.

3. A method of shaft power generation according to claim 1, wherein an electric circuit is provided which is adapted to return a portion of the electric power generated by said main generator to said thyristor controller.

4. A method of shaft power generation according to claim 1, wherein an auxiliary generator which is driven by an auxiliary engine is provided, and an electric circuit is provided which is adapted to input the electric power generated by said auxiliary generator to said thyristor controller.

5. A method of shaft power generation according to claim 2, wherein an electric circuit is provided which is adapted to return a portion of the electric power generated by said main generator to said transistor controller.

6. A method of shaft power generation according to claim 2, wherein an auxiliary generator which is driven by an auxiliary engine is provided, and an electric circuit is provided which is adapted to input the electric power generated by said auxiliary generator to said transistor controller.

7. An apparatus for shaft power generation characterized in that:
mechanical power taken out from a main engine is divided into two portions for respective systems; one of the portions of the divided mechanical power is directly input to a differential planetary gear mechanism; the other portion of the divided mechanical power is input to said differential planetary gear mechanism through a subsidiary generator, a thyristor or transistor controller and a thyristorized or transistorized motor, each of which has a capacity which is equal to a value obtained by adding a slight allowance to a value obtained by multiplying the capacity of a main generator by the ratio between a first value and a second value, said first value being obtained by the difference between the lowest and highest number of revolutions of said main engine of the range within which the mechanical power therefrom is employed for power generation, said second value being said highest number of revolutions, thereby combining into one said two portions of the divided mechanical power; and said main generator is driven at its rated number of revolutions by the combined mechanical power output from said differential planetary gear mechanism, and in that
said differential planetary gear mechanism and said main generator are secured on a base board in series, and said subsidiary generator is provided on a side of said main generator, while said thyristorized or transistorized motor is installed on the upper side of said main generator.

8. An apparatus for shaft power generation characterized in that:
mechanical power taken out from a main engine is divided into two portions for respective systems; one of the portions of the divided mechanical power is directly input to a differential planetary gear mechanism; the other portion of the divided mechanical power is input to said differential planetary gear mechanism through a subsidiary generator, a thyristor or transistor controller and a thyristorized or transistorized motor, each of which has a capacity which is equal to a value obtained by adding a slight allowance to a value obtained by multiplying the capacity of a main generator by the ratio between a first value and a second value, said first value being obtained by the difference between the lowest and highest number of revolutions of said main engine of the range within which the mechanical power therefrom is employed for power generation, said second value being said highest number of revolutions, thereby combining into one said two portions of the divided mechanical power; and said main generator is driven at its rated number of revolutions by the combined mechanical power output from said differential planetary gear mechanism, and in that
an intermediate shaft for inputting the mechanical power from said main engine, said differential planetary gear mechanism and said main generator are installed on a base board in series, and said subsidiary generator is installed on the upper side of a bearing pedestal which supports said intermediate shaft, while said thyristorized or transistorized motor is installed on the upper side of said main generator.

* * * * *